Dec. 16, 1924.
E. K. BAKER
1,519,751
EXTENSIBLE WHEEL CARRIER
Filed July 28, 1922　　2 Sheets-Sheet 1
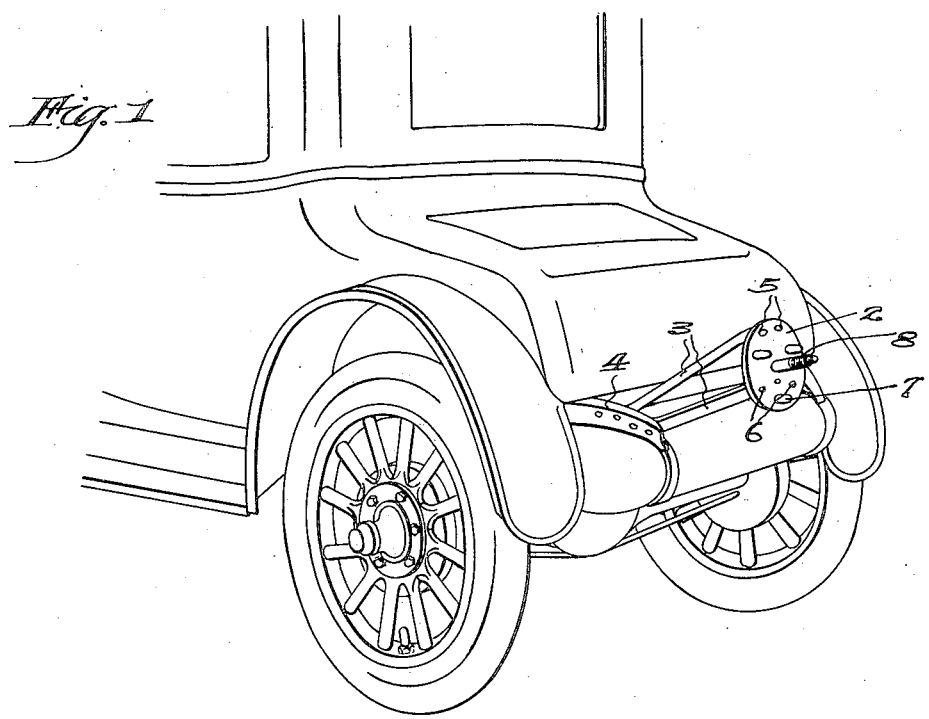
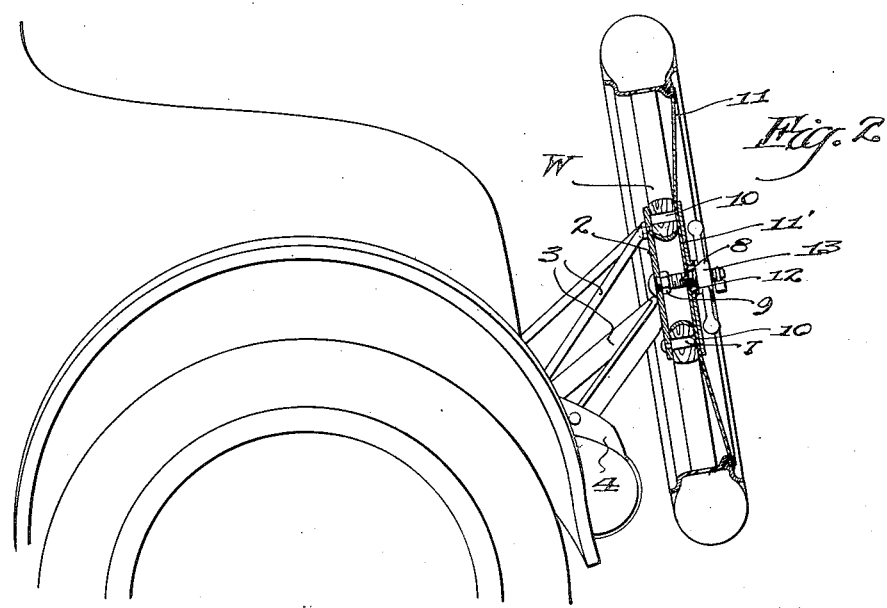

Dec. 16, 1924.
E. K. BAKER
EXTENSIBLE WHEEL CARRIER
Filed July 28, 1922
1,519,751
2 Sheets-Sheet 2
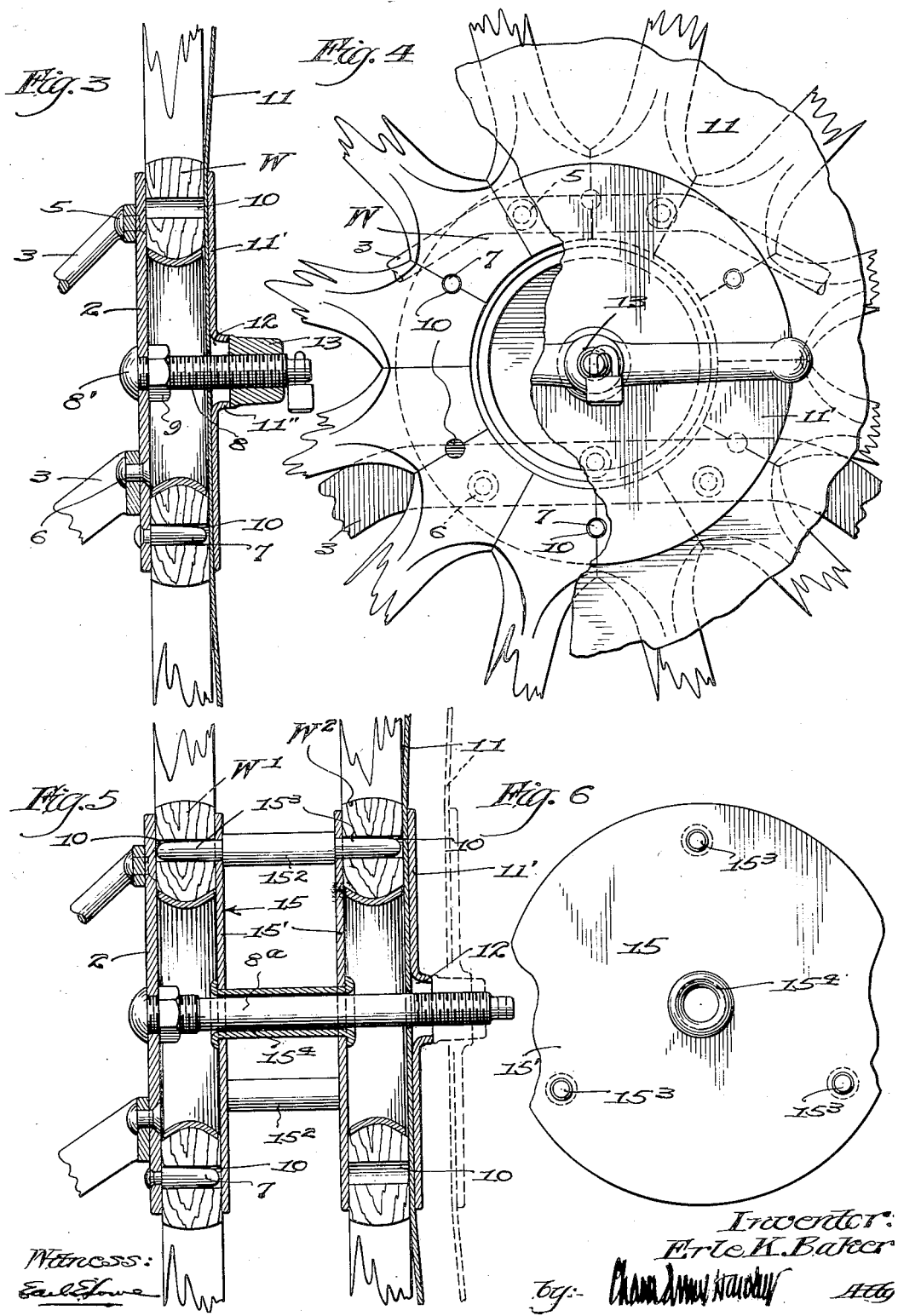

Patented Dec. 16, 1924.

1,519,751

UNITED STATES PATENT OFFICE.

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

EXTENSIBLE WHEEL CARRIER.

Application filed July 28, 1922. Serial No. 578,159.

*To all whom it may concern:*

Be it known that I, ERLE K. BAKER, a citizen of the United States, and a resident of Chicago, Cook County, Illinois, have invented certain new and useful Improvements in Extensible Wheel Carriers, of which the following is a specification.

My invention relates to motor vehicles, and especially refers to means for the carriage of a spare wheel or wheels equipped with pneumatic tires.

The object of my invention is to provide a wheel carrier of simple and sturdy construction, not likely to get out of order or be damaged, and which will securely hold one or two spare wheels and tires, and afford the user much ease and comfort when a wheel change is required.

The invention will be readily understood on reference to the accompanying drawings; wherein, Fig. 1 is a perspective view of a motor vehicle equipped with a wheel carrier embodying my invention; Fig. 2 is a vertical sectional view of the carrier and a single wheel secured thereon; Fig. 3 is an enlarged detail of the center portion of a wheel and the carrier; Fig. 4 is an outer face view thereof; Fig. 5 is a sectional view like unto Fig. 3 but showing how two wheels are carried; and Fig. 6 is a face view showing the spacing member of the extensible carrier, separated from the other parts.

The supporting member of my novel wheel carrier comprises a center plate 2 and the arms 3 by which the same is attached to the side frames 4 of the motor vehicle. In some forms of my invention the parts 2 and 3 are made from a single piece, but otherwise the arms 3 are separate and are attached to the top and bottom of the part 2 by rivets 5 and 6.

Near the periphery of the part 2 are the spaced apart studs 7, the use of which will be explained. A heavy threaded bolt or stud 8 projects from the center of the part 2. In detail, as shown in Figs. 3 and 5, the bolt 8 has a head 8' which engages part 2, and the bolt is fastened in the part 2 by means of a follower nut 9.

The wheels to be secured on such a carrier contain twice as many hub bolt holes 10 as there are studs 7. The holes 10 and studs 7 are similarly spaced and the wheel is attached to the carrier by placing it on the studs 7, which, as here shown, enter three of the holes 10. When in place the wheel receives a weather-proofing part, in the form of a dished disc or plate 11, the center hole 12 of which fits on the extended end of the carrier bolt or stud 8. At the middle of the disc 11 is a reinforcing plate 11' having an outturned center flange 11". The wheel and the protecting disc 11 are fastened firmly against the supporting member 2 by means of a large nut 13 on the outer end of the stud 8. This nut preferably takes the form of a cross-bar, so that it may be turned up by hand, also removed by hand.

The outer end of the stud 8 contains a hole for the reception of a pad-lock hasp or the like to secure the wheel against theft.

It should be explained that the purpose of the reinforcing plate 11' of the disc 11 is to transmit the thrust of the cross-arm or nut 13 from the center stud 8 to the hub portion of the wheel, wherein the supporting studs 7 are lodged. Further, by this arrangement the whole face of the wheel, that is of its hub portion W, is lodged squarely against the supporting disc or plate 2 so that the wheel cannot oscillate or rattle thereon, as contrasted with those arrangements wherein the wheel is supported directly on a center stud, such as the stud 8 may be thought to resemble.

It is frequently necessary to carry two wheels and for such uses I make the center stud or bolt of greater length; as shown by the bolt $8^a$ in Fig. 5. And for use between the two wheels $W^1$ and $W^2$ I provide a spacing member 15. This member comprises two small discs 15' of the size as the part 2, and three spacing studs having large body portions $15^2$ and reduced ends or stud portions $15^3$. Further, the parts 15' are permanently unified or bound upon the parts $15^2$ by means of a central sleeve $15^4$, having its ends flanged or riveted against the parts 15', as is shown in Figs. 5 and 6. The weatherproofing or protecting disc remains as before.

The first wheel being placed on the studs 7 of the part 2, is followed by the spacer 15, the studs of which enter those holes 10 of the first wheel not occupied by the studs 7. The second wheel is then placed on the outwardly extending studs $15^3$ of the spacer. Thereafter the protecting disc 11 is fastened in place and the wheels are jammed together on the member 2 by turning up the cross-bar or nut, as before explained.

It will at once be obvious to those skilled in the art that the essential element of this construction includes the reinforcing or thrust distributing plate 11′ and that if desired the protecting disc 11 may be omitted in the simpler forms of my invention.

Having thus described my invention I claim as new and desire to secure by Letters Patent—

1. The improvement herein described comprising a supporting member 2 and a central stud 8 projecting therefrom, in combination with spaced wheel supporting studs on said member 2, a spacer having wheel supporting studs projecting from both sides to couple two wheels, a thrust distributing plate 11′, and a thrust nut on said central stud.

2. The improvement herein described comprising a supporting member 2 and a central stud 8 projecting therefrom, in combination with spaced wheel supporting studs on said member 2, a spacer having wheel supporting studs projecting from both sides to couple two wheels, and a thrust nut on said central stud.

In testimony whereof, I have hereunto set my hand this 24th day of July, 1922.

ERLE KING BAKER.